No. 712,793. Patented Nov. 4, 1902.
W. G. HENIS & F. C. JAMISON.
COOKING VESSEL.
(Application filed Sept. 6, 1901.)
(No Model.)
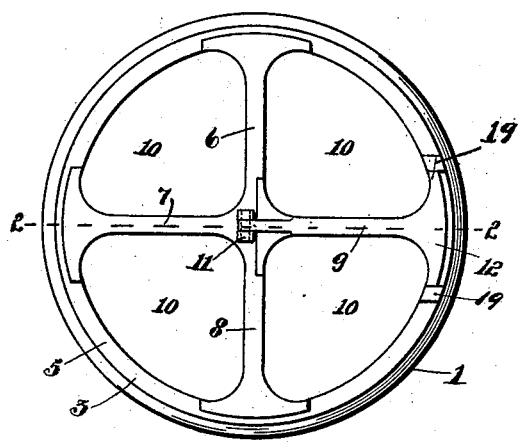
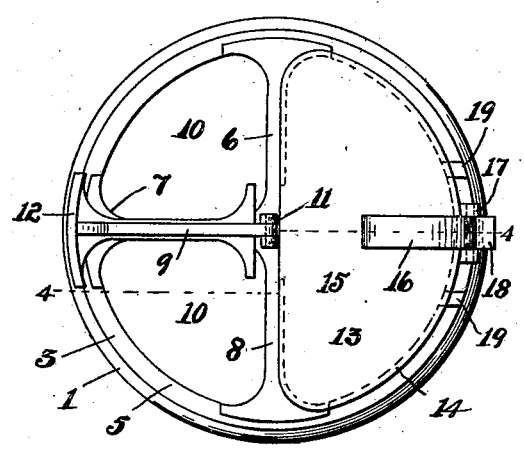
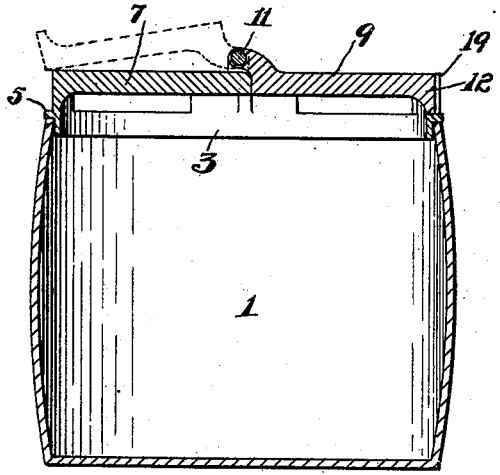
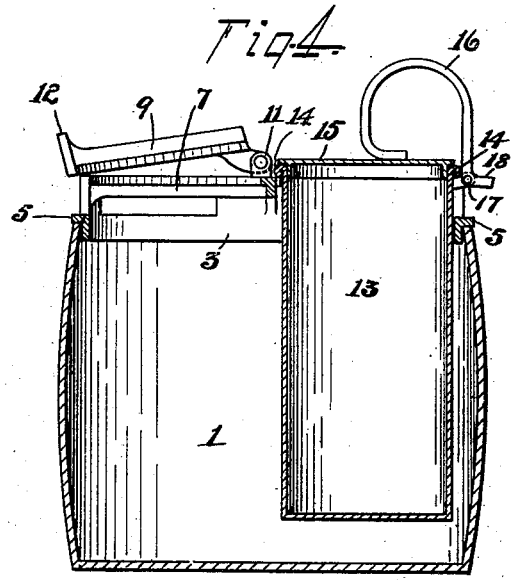
WITNESSES:
A. V. Groupe
Walter C. Pusey
INVENTORS:
William G. Henis,
Frank C. Jamison,
BY Joshua Pusey,
ATTORNEY.

UNITED STATES PATENT OFFICE.

WILLIAM G. HENIS AND FRANK C. JAMISON, OF PHILADELPHIA, PENNSYLVANIA.

COOKING VESSEL.

SPECIFICATION forming part of Letters Patent No. 712,793, dated November 4, 1902.

Application filed September 6, 1901. Serial No. 74,502. (No model.)

*To all whom it may concern:*

Be it known that we, WILLIAM G. HENIS and FRANK C. JAMISON, citizens of the United States, residing in the city and county of Philadelphia, in the State of Pennsylvania, have invented certain new and useful Improvements in Cooking Vessels, of which the following is a full, clear, and exact description, reference being had to the accompanying drawings, of which—

Figure 1 is a plan view, the insertible vessels having been removed. Fig. 2 is a section on line 2 2, Fig. 1. Fig. 3 is a plan view showing the hinged bar thrown back and an insertible vessel in place. Fig. 4 is a section on line 4 4, Fig. 3.

This invention relates to that kind of cooking pots or vessels which are intended to contain removable receptacles for holding articles to be cooked by the heat of the water within the pot or vessel.

Our improvements relate to certain details and features of construction hereinafter described and particularly pointed out.

Referring to the accompanying drawings, 1 is the pot, of usual form, upon the top of which is an annulus 3, that is detachable, the same having a peripheral flange 5, that rests upon the top edge of the pot when the annulus is in place. Extending from the upper part of the periphery of said annulus and meeting in the center thereof are four cross-bars 6, 7, 8, and 9, thus leaving openings 10. The bars 6, 7, and 8 are fixed to the annulus or, preferably, are integral therewith, as in the present instance, while the bar 9 is pivotally connected by a hinge 11 to the other of said bars at their meeting-point, as shown, the free end of the bar 9 having also in this instance a head 12, that is adapted to rest upon the annulus when the bar is in the closed position. The openings 10 are adapted to receive vessels of suitable shape and dimensions that are to be entered into the pot 1, such vessels having flanges or projections at or near their upper ends that rest upon the top of the walls of the openings. We have not shown these vessels in the drawings; but they are of the same construction as a vessel marked 13 in the drawings, which we will hereinafter describe. When this latter vessel is intended to be used, the pivoted bar 9 is thrown over into the position seen in Figs. 3 and 4 and indicated by dotted lines in Fig. 2. Said vessel is of the shape in cross-section to conform to the shape of the opening through the annulus that is formed when the bar 9 is so thrown over. It is preferably made of sheet metal and has a peripheral flange 14. It has a cover 15 and a closed bottom and is provided at about midway of its outer or semicircular edge with a handle 16, that is secured to the cover 15 and is pivoted by a hinge 17 to the side of the vessel and has also a projection 18, which extends at right angles to the handle and is adapted to stop against the side of the vessel when the cover is opened. It will be observed that the hinge 17 is extended above the cover 15 and arched to form an elongated handle-loop, by which the vessel may be conveniently lifted and carried.

When four of the aforementioned vessels are to be used, each having flanges similar to the flange 14 of the vessel 13 and each having a hinged handle similar to that of vessel 13, they are respectively passed through the openings 10 into the pot 1 (the hinged bar 9 being then in position) until their flanges 14 rest upon the walls of said openings. In like manner when it is desired to use the larger vessel 13 in lieu of the two smaller ones, the bar 9 being first thrown back, the said vessel is entered in the opening 10, all as seen in Figs. 3 and 4. This vessel, and similarly the others referred to, may be lifted out of the pot by the handle, and the cover may then be opened by means of said handle. By suitably holding the handle and tilting forward the said vessel 13 the water within the latter may be poured out and the vegetables or the like within the vessel be prevented from escaping.

In order to maintain the free end of the bar 9 firmly in place when in use, we provide two lugs 19, that project upwardly from the annulus 3, between which the head 12 of said bar is adapted to fit, the top of the latter being flush with the top of said lugs and in the same horizontal plane as the top of the other cross-bars.

Having thus described our invention, we claim as new and desire to secure by Letters Patent—

1. In a cooking vessel, the combination with a pot, of a frame detachably mounted on said pot, a series of cross-bars or supports arranged diametrically of said frame and upon which the cooking vessels proper are adapted to rest, one of said bars being hinged to the others, whereby the same may be swung upon the rigid cross-bars to adapt the frame for receiving a cooking vessel of enlarged dimensions, and means for holding the free end of said hinged bar firmly in position upon said frame when said end is swung into contact with the frame.

2. In a cooking vessel, the combination with a pot, of a frame detachably mounted on said pot, a series of cross-bars or supports arranged diametrically of said frame and upon which the cooking vessels proper are adapted to rest, one of said bars being hinged to the others, whereby the same may be swung upon the rigid cross-bars to adapt the frame for receiving a cooking vessel of enlarged dimensions, said hinged bar having its free end enlarged to form a head, and parallel-spaced upwardly-projecting lugs carried by said frame and between which said head is adapted to fit to be held firmly in position upon the frame when swung into contact therewith.

In testimony whereof we have hereunto affixed our signatures this 23d day of July, A. D. 1901.

WILLIAM G. HENIS.
FRANK C. JAMISON.

Witnesses:
ANDREW V. GROUPE,
WALTER C. PUSEY.